June 4, 1963  R. P. CRAIG ETAL  3,092,194
BAG PACKER AND WEIGHER
Filed Feb. 6, 1959  5 Sheets-Sheet 1
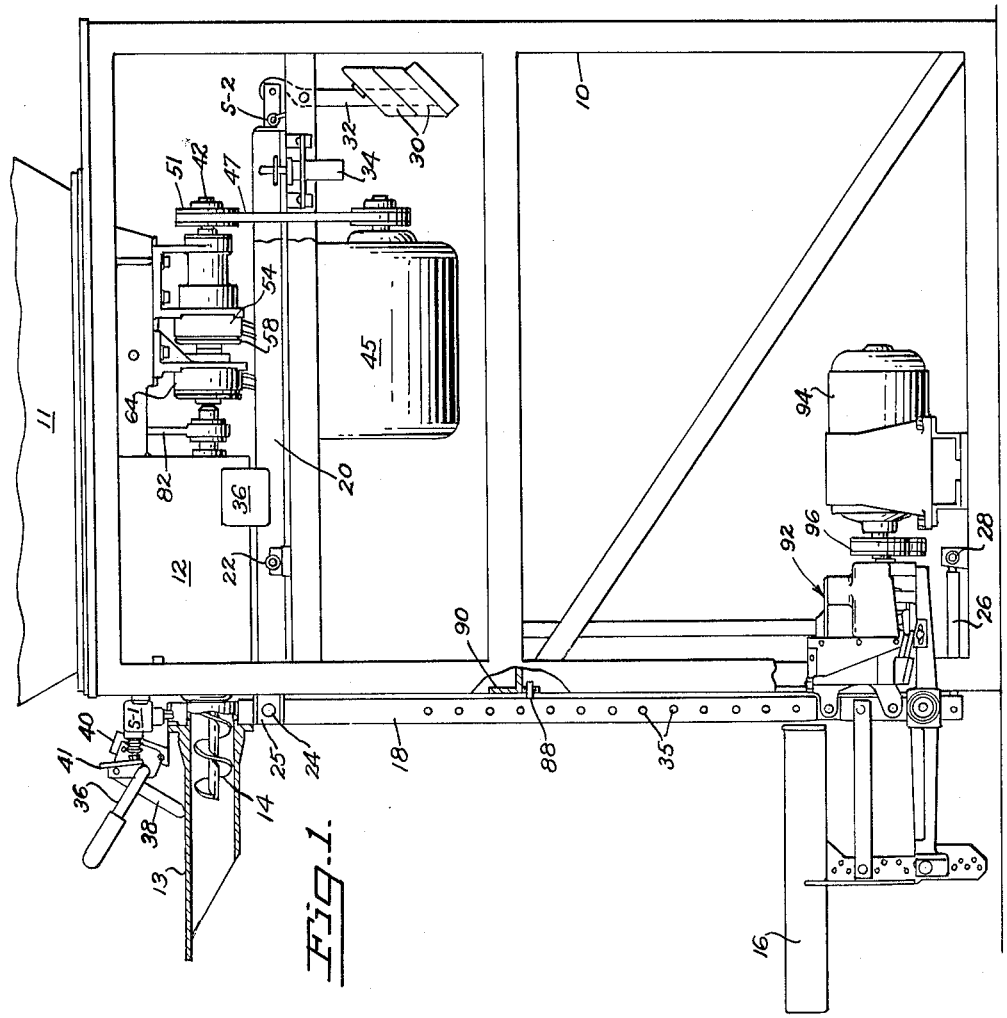
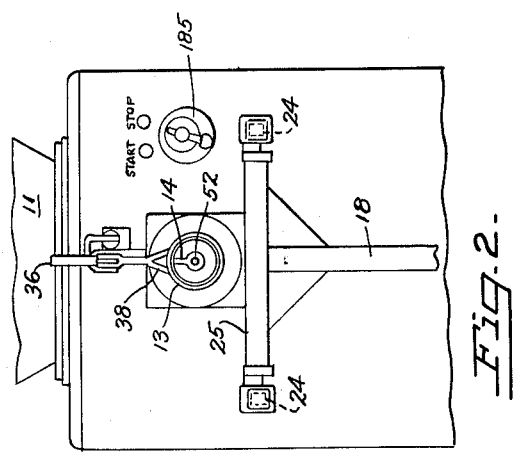
INVENTORS
ROBERT P. CRAIG
LAWRENCE E. WEINERT
BY
*Fryer & Johnson*
ATTORNEYS

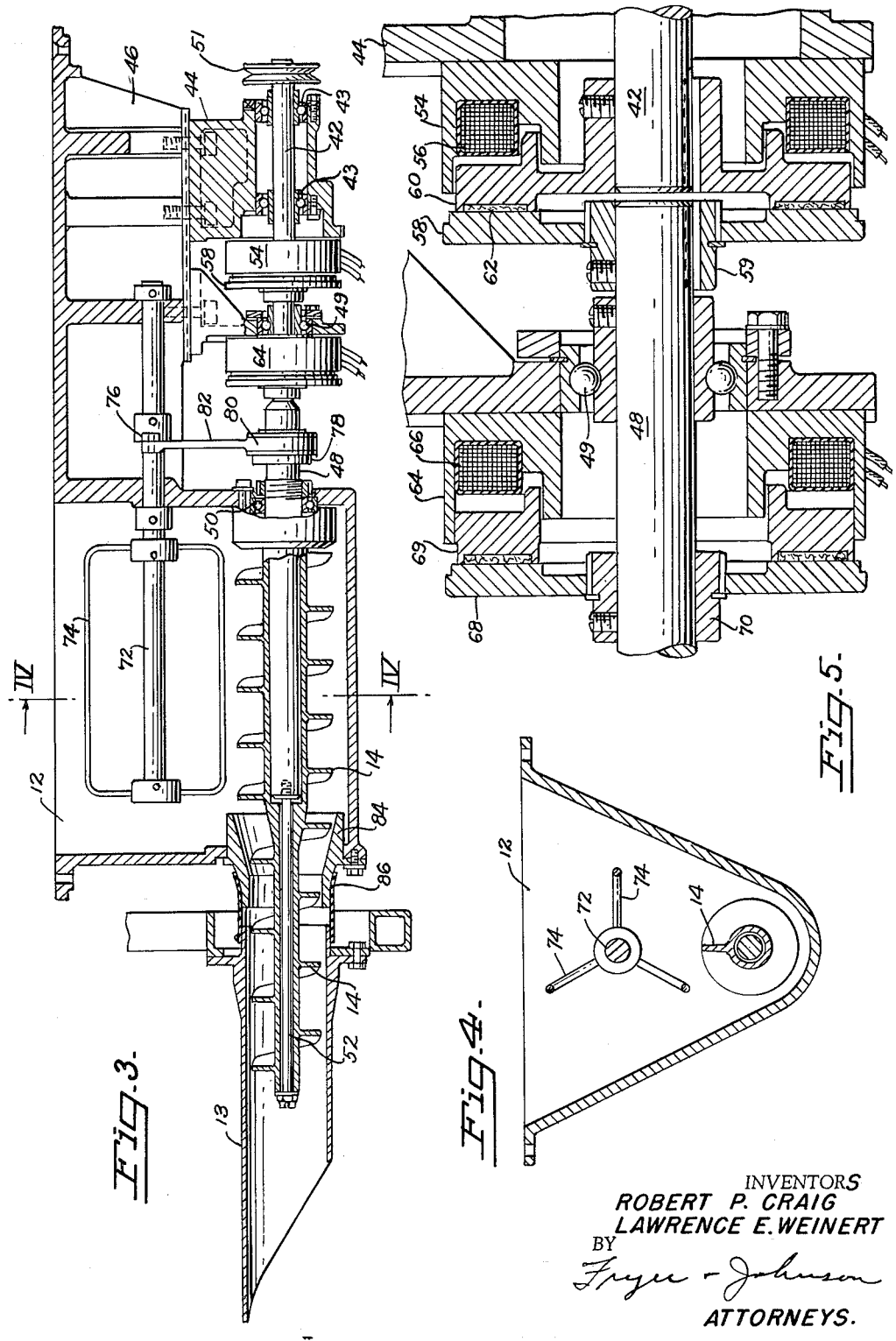

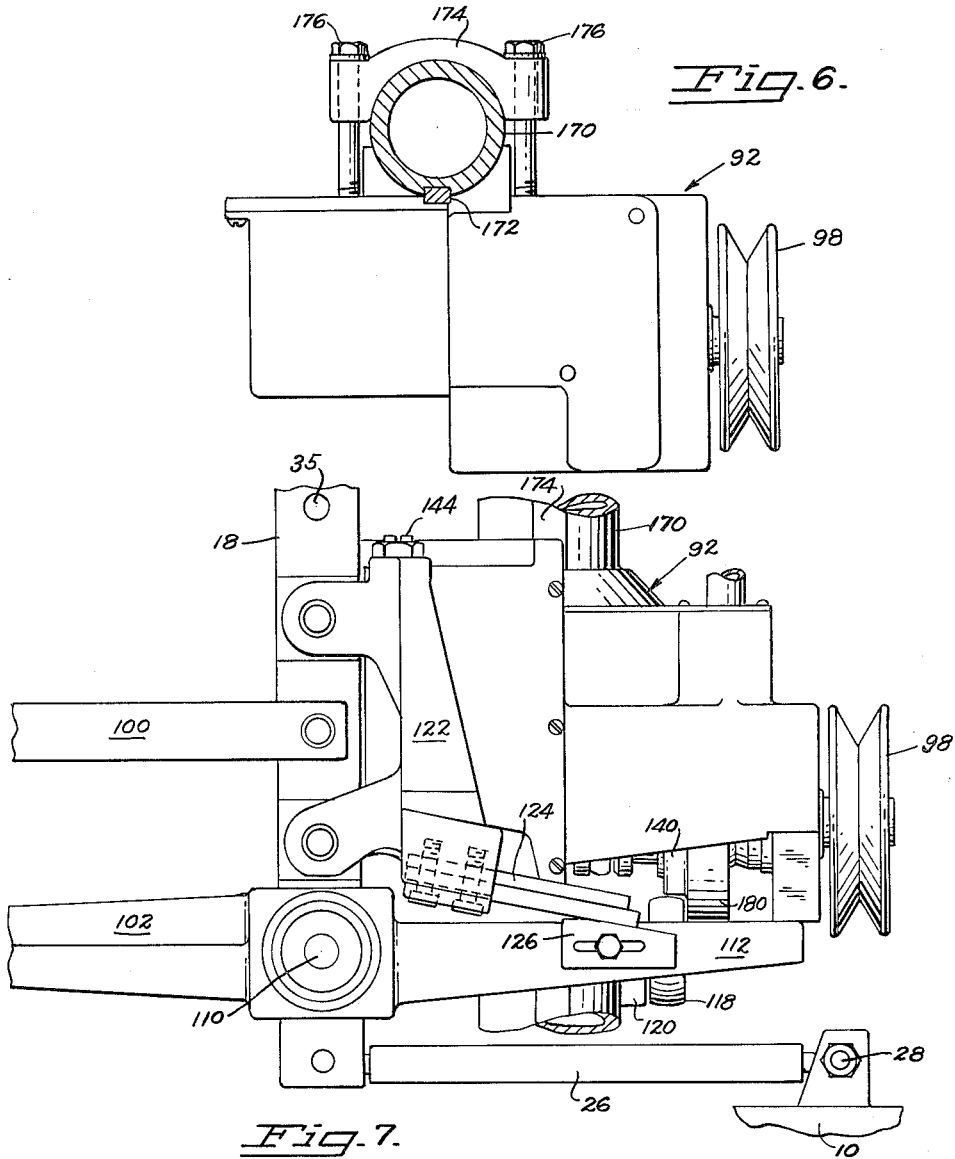

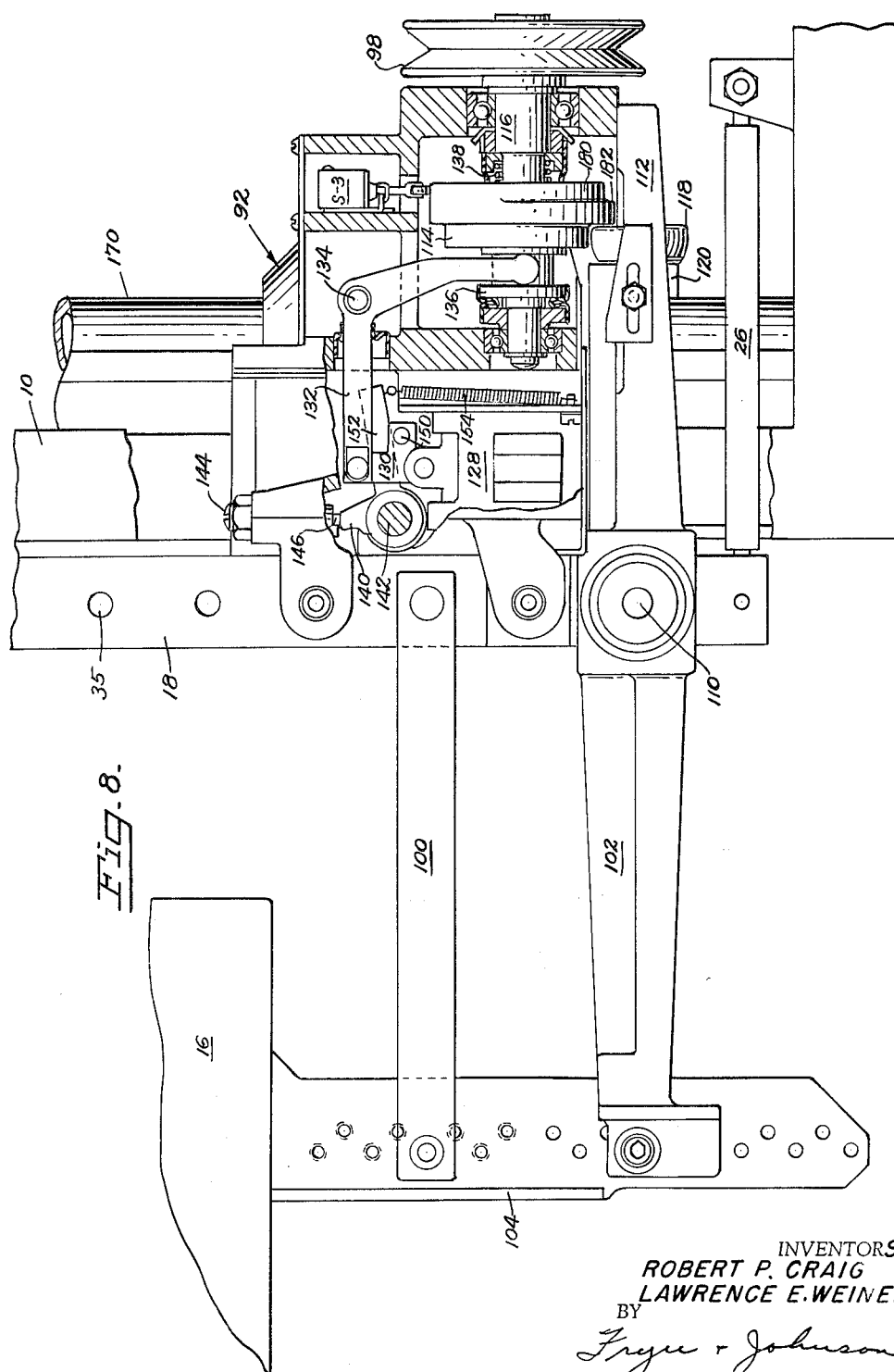

June 4, 1963 R. P. CRAIG ETAL 3,092,194
BAG PACKER AND WEIGHER
Filed Feb. 6, 1959 5 Sheets-Sheet 5
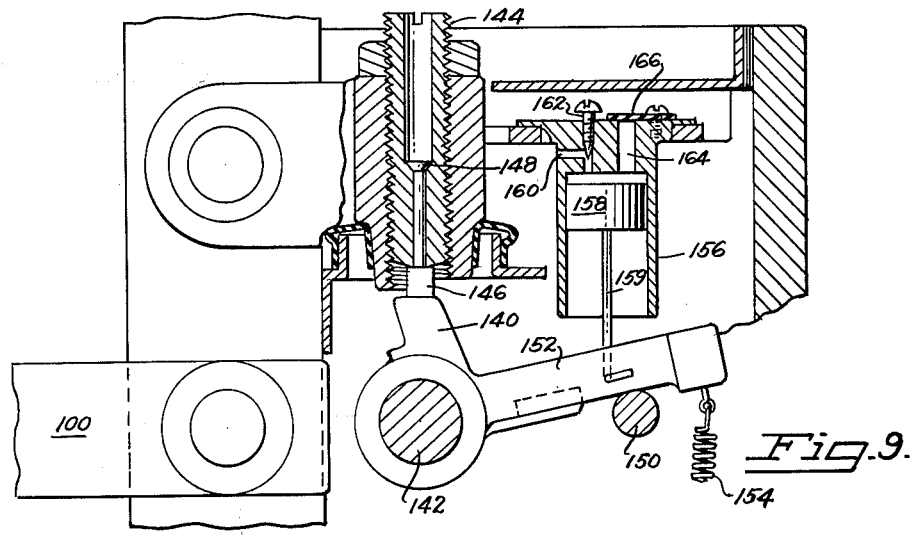
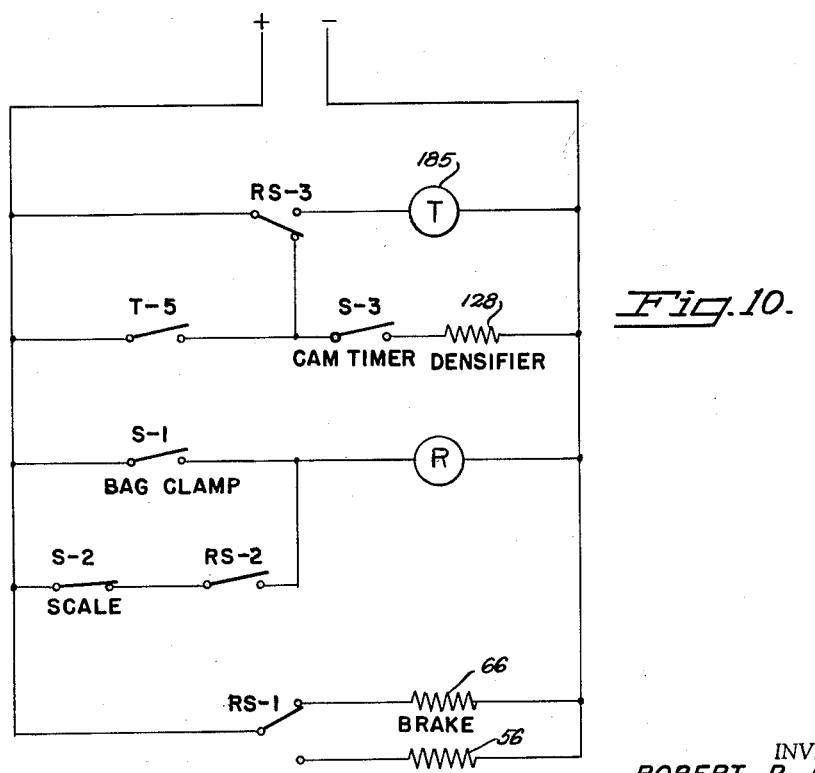
INVENTORS
ROBERT P. CRAIG
LAWRENCE E. WEINERT
BY
Fryer + Johnson
ATTORNEYS

United States Patent Office 3,092,194
Patented June 4, 1963

3,092,194
BAG PACKER AND WEIGHER
Robert P. Craig, Walnut Creek, and Lawrence E. Weinert, Antioch, Calif., assignors to Crown Zellerbach Corporation, San Francisco, Calif., a corporation of Nevada
Filed Feb. 6, 1959, Ser. No. 791,652
8 Claims. (Cl. 177—154)

This invention relates to devices for filling and weighing bags with pulverized or granular material.

It is well known in the art of filling bags to support the bag to be filled on a scale while feeding material into the bag and then stop the feeding of material in response to movement of the scale when the contents of the bag attain a given weight. It is also common practice to jig the bag in various ways to densify its contents during the filling period. The jigging action is destructive to the weighing mechanism and means are also known for disabling or otherwise protecting the scale during the jigging period.

It is the object of the present invention to provide an improved bag packer and weigher of the kind generally described capable of high speed operation and of being quickly started and stopped with a full flow of material having a minimum of voids or included air spaces.

A further object of the invention is to provide a packer with an efficient jigging action capable of maximum densification of the bag contents with a minimum hazard to the scale parts.

Further objects and advantages of the invention are made apparent in the following specification wherein reference is made to the accompanying drawings which illustrate a bag packer and weigher constructed in accordance with the present invention.

In the drawings:

FIG. 1 is a view in side elevation of a packing and weighing machine embodying the present invention;

FIG. 2 is a view in front elevation of the upper portion of the machine shown in FIG. 1;

FIG. 3 is an enlarged vertical longitudinal section through the material hopper, screw feeder and operating mechanism therefor the same machine;

FIG. 4 is a sectional view through the feed hopper taken on the line IV—IV of FIG. 2;

FIG. 5 is an enlarged central vertical section through clutch and brake mechanisms which control the feed screw;

FIG. 6 is an enlarged plan view of the packing or densifying mechanism illustrating the manner in which it is affixed to the frame of the machine;

FIG. 7 is a view in side elevation of the same mechanism illustrated in FIG. 6;

FIG. 8 is an enlarged view with parts in section and parts broken away of the densifying mechanism also illustrating the manner of its connection with the bag saddle;

FIG. 9 is an enlarged fragmentary view illustrating the details of construction of the scale lockout mechanism which are incorporated in the densifier shown in FIG. 8; and FIG. 10 is a schematic wiring diagram illustrating the circuits which control the automatic cycle of the machine.

Referring first to FIG. 1 of the drawings, the machine of the present invention is illustrated as supported on suitable frame work generally indicated at 10. The frame is disposed beneath and supports a material bin, the lower portion of which is shown at 11 and the bottom of which opens into a hopper illustrated at 12, the configuration of which is most clearly shown in FIGS. 3 and 4. A filler spout 13 communicates with the hopper and also serves as a support for a bag to be filled when the valve portion of the bag is slipped over the spout.

The shape of this spout may be varied if containers other than valve type bags are to be filled. A feed screw shown at 14 extends through the bottom of the hopper 12 and projects outwardly into the spout to impel material from the hopper into the bag at the end of the spout.

The bottom of the bag is supported in a bag saddle 16 and this saddle together with the spout 13 which cooperate in supporting the bag and its contents are both supported on a vertical post 18 of a scale mechanism which includes a scale beam formed of two spaced bars 20. The scale beam is balanced on fulcrums at 22 which are of a conventional knife-edge type and is also connected by knife-edge pivots, not shown, at the points 24 with a cross piece 25 on the vertical scale post 18. The lower end of the scale post is connected by a link 26 pivotally connected as at 28 to a bracket on the frame, the length of the link being the same as the distance between the pivotal knife-edge supports 22 and 24 to produce a parallel linkage which compels the scale post 18 to maintain a vertical position during its upward and downward movement. Counterweights 30 of a number depending upon the size of bags being filled and the weight of material in the bags are carried on a counterweight support 32 depending from the end of the scale beam 20. A dash pot illustrated at 34 has a plunger connected to the scale beam adjacent its end and dampens the motion of the beam so that any sudden application of weight will not produce the false effect of the bag being full to capacity. A poise 36 is mounted for sliding movement along the beam to effect fine adjustments of balance. Adjacent the end of the scale beam is a switch, the actuating arm of which is shown at S-2 and which will open upon raising of the beam by a filled bag and will discontinue the flow of material to the bag in a manner later to be described.

When a bag is to be filled, its valve located at an upper corner is slipped over the filling spout 13 and the bottom of the bag is disposed in a position to rest in the saddle 16. This saddle and other associated parts may be raised and lowered to accommodate bags of different sizes, there being a plurality of equally spaced holes such as shown at 35 to enable these adjustments. The top of the bag is clamped to the spout by a toggle clamp shown at 36 which is of conventional construction and includes an arm 38 which engages the bag and presses it against the spout. This clamp is secured to a bracket 40 which is also carried by the vertical scale post 18 and has secured to it a plate 41 which upon engaging movement of the clamp, contacts a starting switch shown at S-1. This switch, through circuits later to be described, effects release of a brake and engagement of a clutch to initiate actuation of the feed screw 14.

The mounting of the feed screw and the means for operating it are best illustrated in FIGS. 3 and 5 where a drive shaft 42 is shown as carried in bearings 43 in a bracket 44 secured to an integral extension 46 of the casting which forms the hopper 12. A continuously operating motor 45 (FIG. 1) is connected with the drive shaft by means of a belt 47 and a sheave 51 on the shaft. A driven shaft 48 is carried in a similarly supported bearing 49 at one end and in a bearing 50 in the wall of the hopper 12. The feed screw has a hollow spindle which slides over the end of the shaft 48 and is secured in place thereon by an elongated screw 52 so that the drive screw may be removed for replacement or repair independently of the drive and driven shafts and their associated mechanisms.

The drive and driven shafts are connected by a magnetic clutch 54 with a winding 56 which is stationary with respect to the bracket 44. Upon energization of this winding, a clutch plate 58 splined to a collar 59 which is secured against rotation on the shaft 48 is drawn into engagement with a clutch plate 60 secured against rotation on the drive shaft 42. Suitable material such as indicated at 62 may be employed between the clutch plates for insuring a firm driving connection when the winding 56 is energized. A brake 64 similar in design to the clutch also has a winding 66 fixed with respect to the bracket which supports the bearing 49 of the driven shaft 48. Energization of the winding 66 attracts a brake disc 68 into engagement with the frictional surface on a brake disc 69. The brake disc 69 is also fixed against rotation and the disc 68 is splined for axial sliding movement with respect to a collar 70 fixed for rotation with the driven shaft. The clutch 54 and brake 64 are operated simultaneously but oppositely so that the clutch is engaged and the brake released at the same instant to impart driving motion to the feed screw 52.

When a feed screw of the kind described is employed with powdery material which is inclined to pack, it is not uncommon for the material to form an arch above the screw interrupting its function of continuously feeding the material to the bag. To prohibit such packing and arching of the material, it is customary to employ some means of agitating the material directly above the feed screw. This is accomplished in the present invention by an oscillating agitator shown in FIGS. 3 and 4 as a shaft 72 carrying radially projecting agitating arms shown as three in number at 74. The shaft is journaled for oscillating movement in a wall of the hopper 12 and in a part of the extended casting thereof and a crank arm 76 is secured to this shaft. An eccentric drive cam 78 is carried on the driven shaft 48 for rotation therewith and encircled by a strap 80 which through a connecting rod 82 imparts oscillatory movement to the shaft 72 and the agitator carried by it.

The impeller screw projects outwardly through the front wall of the hopper 12 through a short spout 84 fitted in said wall and this spout is connected as by a flexible rubber tube shown at 86 with the inner end of the filler spout 13. Thus the filler spout is enabled to move upwardly and downwardly with the scale parts to which it is affixed while the short spout 84 is rigidly positioned with respect to the main frame of the machine. As is shown in FIG. 3, the outer end of the feed screw is somewhat smaller than the inner end and slightly smaller in diameter than the inside of the feed spout 13 to enable vertical movement of the feed spout 13 as just described. Upward movement of the scale parts which carry the feed spout is limited to prevent engagement of the bottom of the spout with the bottom of the feed screw by means of a stop screw shown as carried in a bracket 88 (FIG. 1) which projects from the scale post 18 and engages a frame part 90.

The packer or densifier which effects jigging of the bag as it is being filled is generally indicated at 92 in FIG. 1 as driven by a continuously operating motor 94 through a belt 96 which drives a sheave 98 most clearly illustrated in FIGS. 6, 7 and 8 wherein the construction of the densifier mechanism is illustrated in detail. In FIG. 8, the bag saddle 16 is shown as supported with relation to the scale post 18 by parallel linkage which comprises a link 100 and a lever 102 both pivotally connected to the post and to a vertical support 104 of the bag saddle. Multiple perforations are provided to enable raising and lowering of the bag saddle with respect to the post 18 to accommodate bags of slightly different sizes. The lever 102 is pivoted to the post 18 at the point 110 and extends inwardly from this point to provide an impact arm shown at 112. In order to strike this arm to effect jigging of the bag above the opposite end of the lever, the housing of the densifier unit contains a cam 114 splined for sliding movement on a shaft 116 rotatable in suitable bearings as shown and driven through the sheave 98 which is fixed to its end. The cam 114 is normally urged toward the left as viewed in FIG. 8 to its operating position in which it is shown and in which it overlies a cam follower roller 118 mounted on a pin, not shown, on an integral part of the arm 112 illustrated at 120. When the lobe of the cam 114, which is shown in the uppermost position in FIG. 8, strikes the cam follower 118, the arm 112 of the lever 102 is depressed, raising the outer end of the lever and then letting it drop under the weight of the contents of the bag in the saddle 16. Upon dropping movement, the end of the arm 112 strikes the bottom of the housing which provides a fixed stop. The sharpness of this impact is, however, controlled by a spring assembly shown in FIG. 7 carried on a bracket 122 secured to the scale post 18 and carrying a pair of leaf springs 124 which are inclined over the lever arm 112 for engagement with an adjustable stop 126. Adjustment of this stop is effective to cause contact of the springs 124 just prior to contact of the arm 112 with the housing. This jigging action is continuous except for a short period just before a bag is filled and while the jigging action is taking place, the scale post 18 is held in a raised position so that the scale is disabled and a minimum of vibration is transmitted to the knife edges of the scale beam. Just prior to the completion of the filling of a bag, the densifying or jigging action is stopped and the scale beam is released. This is accomplished by a solenoid 128, see FIG. 8, the armature of which is connected with an L-shaped link 130 depending from a lever 132 pivotally supported as at 134. The opposite end of this lever is forked and received in the groove of a collar 136 formed integrally with the cam 114. Thus when the armature is energized, the cam is retracted from its position over the roller 118 and against the force of a spring 138 which normally urges it toward its operating position.

During the jigging operation, the scale post 18 is held in its raised or inoperative position by a lockout dog 140, best illustrated in FIG. 9 as pivotally mounted on a shaft 142. This dog underlies an adjusting screw 144 threaded through a part of the bracket 122 on the scale post and locked in its adjusted position by the usual lock nut as shown. Since very fine adjustments of the screw 144 are required, it is undesirable to rotate the part which contacts the dog 140 and a wear block 146 is, therefore, provided, this wear block is held in place by a stem which extends upwardly through a bore in the center of the screw and is riveted at its upper end as illustrated at 148. The portion of the bracket through which this screw extends is notched at the bottom of the screw hole to receive the wear block and prevent its rotation. The normal position of the blocking out dog is that shown and it is held in this position by a pin 150 shown in FIG. 8 as carried by the L-shaped link 130 and underlying a tail 152 of the dog. A spring 154 is permitted to retract the dog 140 when the solenoid 128 is energized and lowers the pin 150. The scale lockout dog 140 should not be removed prior to the final impact of the lower arm 112 with the housing, which might occur after retraction of the cam 114. In fact it should be delayed until all vibration resulting from the final impact has subsided. At this time the springs 124 are holding the lever arm 112 slightly below the impact point on the housing to insure that the dog 140 can be retracted without jamming. Removal of the dog 140 is retarded by a dash pot illustrated at 156 in FIG. 9. The dash pot has a plunger 158 connected by a rod 159 with the tail of the dog and downward movement of the plunger is controlled by flow of air through a passage 160 regulated by a screw 162. Upon upward movement of the plunger, air exhausts freely through a passage 164 closed, except during such exhaust, by a resilient flap valve 166.

It is undesirable to retract the cam 114 while its high part or lobe is in contact with the cam follower roller 118 because the weight of the partially filled bag imposes considerable friction between these parts which would unduly burden the solenoid 128. Therefore, to insure energization of the solenoid 128 only at the proper cyclic time, a switch S-3 shown in FIG. 8 has a roller on its actuating arm which bears against the periphery of a cam 180 formed integrally with the cam 114 and separated therefrom by a central concentric portion shown at 182. The switch S-3 is closed by the cam 180 only when the cam 114 is spaced from the follower 118 and consequently the solenoid 128 can be energized only in this portion of the cycle. When the solenoid retracts the cam, the roller of switch S-3 will ride on the concentric portion 182, thus making possible continued energization of the solenoid.

The entire densifier assembly 92 is supported for vertical adjustment on a post 170 rigidly connected to the frame work of the machine by means not shown. A spline 172 prevents rotation of the densifier assembly with respect to the post and it is clamped in its vertically adjusted position as by collar means 174 and cap screws 176 shown in FIG. 6.

In operation, the motors 45 and 94 are both started by a control switch disposed in a convenient position on the front of the machine as illustrated in FIG. 2 which also supplies energy to the control circuit presently to be described. Directly beneath the control switch is a timer 185 with a manual adjustment for setting it to a time which is a second or two less than the time required for filling a bag so that the jigging action may be stopped just prior to filling to permit the bag to be weighed. A cycle of operation may be followed by reference to FIG. 10 showing the control circuit. When a bag is clamped in position on the spout 13, the switch S-1 is closed energizing a relay R to actuate the three switches RS-1, RS-2 and RS-3. Switch RS-1 opens the circuit to the brake solenoid 66 and closes the circuit to the clutch solenoid 56 to start the feeding of material into the bag by rotation of the feed screw 14. Switch RS-2 is a holding circuit switch to the relay R which is required because the switch S-1 engaged by the bag clamp is an impulse switch which closes the circuit to the relay only momentarily. Switch RS-3 normally closes the circuit to the solenoid 128 which prevents operation of the densifier. When switch RS-3 is actuated by the relay, it opens this circuit and closes the circuit through the timer 185 which, after the predetermined period for which it has been set will close its own switch TS again completing the circuit to the densifier armature 128 energizing it to discontinue the jigging action at an instant when the cam timer switch S-3 is closed by the cam which it senses. At this time, the bag is nearly filled and, as its contents attain full weight, it balances the scale, raising the inner end of the beam to actuate and open switch S-2 breaking the circuit to relay R and reversing the positions of switches RS-1, RS-2 and RS-3 for the beginning of the next cycle.

Through the structure herein disclosed, the most efficient motion of densifying a powdery material is employed, that is the motion of dropping the container so that the inertia of each particle contributes to densifying the mass. Furthermore, the delicate parts of the scale mechanism are adequately protected so that they may be of light weight and constitute an accurate weighing device. Due to the means employed for releasing the scale support, or protecting means as soon as possible after densification, a long period of densification is attained for each bag and in this connection, the springs 124 tend to suppress residual vibrations to enable quick release of the scale beam. Also since springs 124 are fixedly carried at one end by a movable part 18 of the scale structure and are engageable at the opposite end with pivotally mounted lever arm 112 so as to be interposed between the movable scale part and the lever arm 112, the springs serve to tie in bag support 16 to the entire scale under the load of the bag when the jigging is terminated and the scale is undogged. Consequently, weighing of the bag contents can occur accurately and without lever 112 hitting the stop on the housing or frame of the machine as the springs 124 thrust lever 112 away from such stop during the weighing.

We claim:

1. In a bag packer and weigher of the kind described, a scale having a vertically movable part, a saddle to support a bag to be filled and weighed, a lever pivoted to said scale part and having one end supporting said saddle, a fixed stop limiting upward movement of the opposite end of said lever, a rotatable cam positioned to depress said opposite end of the lever and to release it against said stop, means to rotate the cam, and resilient means positioned for engagement by the lever just prior to its engagement with the stop.

2. In a bag packer and weigher of the kind described, a scale having a vertically movable part, a saddle to support a bag to be filled and weighed, a lever pivoted to said scale part and having one end supporting said saddle, a fixed stop limiting upward movement of the opposite end of said lever, a rotatable cam positioned to depress said opposite end of the lever and to release it against said stop, means to rotate the cam, dogging means for holding said scale part in an inoperative position, and means to move the cam away from the lever and to remove the dogging means.

3. In a bag packer and weigher of the kind described, a scale having a vertically movable part, a saddle to support a bag to be filled and weighed, a lever pivoted to said scale part and having one end supporting said saddle, a fixed stop limiting upward movement of the opposite end of said lever, a rotatable cam positioned to depress said opposite end of the lever and to release it against said stop, means to rotate the cam, dogging means for holding said scale part in an inoperative position, means to move the cam away from the lever and to remove the dogging means, and means to delay removal of the dogging means until vibration of the final impact of the cam has stopped.

4. In a bag packer and weigher of the kind described, a scale having a vertically movable part, a saddle to support a bag to be filled and weighed, a lever pivoted to said scale part and having one end supporting said saddle, a fixed stop limiting upward movement of the opposite end of said lever, a rotatable cam positioned to depress said opposite end of the lever and to release it against said stop, means to rotate the cam, dogging means for holding said scale part in an inoperative position, means to move the cam away from the lever and to remove the dogging means, and sensing means to prevent removal of the cam and dogging means while the cam is in engagement with the lever.

5. In a bag packer and weigher, a scale having a movable part, a lever structure pivotally connected to said movable part and projecting beyond opposite sides thereof, a bag support carried by one end portion of the lever structure, means for imparting a jigging action to said lever structure, means operable near completion of the bag filling to stop said jigging action, and means interposed between the movable scale part and the opposite end portion of said lever structure for resisting said jigging action in one direction of movement of the lever structure and to tie in said lever structure and said bag support with said movable scale part upon stopping of said jigging action.

6. In a bag packer and weigher, a scale having a movable part, a lever structure pivotally connected to said movable part and projecting beyond opposite sides thereof, a bag support carried by one end portion of the lever structure, means for imparting a jigging action to said lever structure, means operable near completion of the bag filling to stop said jigging action, and a leaf spring carried by said movable scale part and engageable with the opposite end portion of said lever structure for resisting said jigging action in one direction of movement of the lever structure and to tie in said lever structure and 7. A bag packer and weigher comprising a scale having a movable part, a lever structure pivotally connected to said movable part and projecting beyond opposite sides thereof, a bag support carried by one end portion of said lever structure, means to impart jigging action to the opposite end portion of said lever structure as a bag on said bag support is being filled, means to dog said movable scale part against movement during said jigging action, means automatically operable near completion of the bag filling to stop the jigging action and release said dogging means to allow said movable scale part to move for weighing the filled bag, and a leaf spring having one end thereof fixedly secured to said movable scale part above said opposite end portion of the lever structure and its opposite end engageable with said opposite end portion of the lever structure to cushion said jigging action while said movable scale part is dogged and to tie in the bag support with the movable scale part upon release of said dogging means.

8. A bag packer and weigher comprising a scale having a movable part, a lever structure pivotally connected to said movable part and projecting beyond opposite sides thereof, a bag support carried by one end portion of said lever structure, means to impart jigging action to said lever structure as a bag on said bag support is being filled, means to dog said movable scale part against movement during said jigging action, means operable near completion of the bag filling to stop said jigging action and to release said dogging means to allow said movable scale part to move for weighing the bag, and resilient means interposed between said movable scale part and the opposite end portion of said lever structure to cushion said jigging action while said movable scale part is dogged and to tie in said lever structure and said bag support with said movable scale part upon release of said scale part by said dogging means.

References Cited in the file of this patent

UNITED STATES PATENTS

| | | |
|---|---|---|
| 1,241,501 | Edgecomb | Oct. 2, 1917 |
| 1,499,338 | Bond | July 1, 1924 |
| 1,861,443 | Holzapfel | June 7, 1932 |
| 1,995,140 | Anolreas | Mar. 19, 1935 |
| 2,345,287 | Peterson | Mar. 28, 1944 |
| 2,469,954 | Dorrington et al. | May 10, 1949 |
| 2,517,954 | Zenke et al. | Aug. 8, 1950 |